US012286347B2

(12) United States Patent
Kim et al.

(10) Patent No.: US 12,286,347 B2
(45) Date of Patent: Apr. 29, 2025

(54) BORON NITRIDE NANOTUBE (BNNT)-NANOPARTICLE COMPOSITES, METHODS FOR THE PREPARATION THEREOF AND THEIR MACROSCOPIC ASSEMBLIES

(71) Applicant: NATIONAL RESEARCH COUNCIL OF CANADA, Ottawa (CA)

(72) Inventors: Keun Su Kim, Ottawa (CA); Benoit Simard, Ottawa (CA); Christopher Thomas Kingston, Ottawa (CA); Homin Shin, Ottawa (CA)

(73) Assignee: National Research Council of Canada, Ottawa (CA)

( * ) Notice: Subject to any disclaimer, the term of this patent is extended or adjusted under 35 U.S.C. 154(b) by 1333 days.

(21) Appl. No.: 16/647,959

(22) PCT Filed: Sep. 18, 2018

(86) PCT No.: PCT/CA2018/051157
§ 371 (c)(1),
(2) Date: Mar. 17, 2020

(87) PCT Pub. No.: WO2019/056092
PCT Pub. Date: Mar. 28, 2019

(65) Prior Publication Data
US 2020/0216317 A1    Jul. 9, 2020

Related U.S. Application Data

(60) Provisional application No. 62/561,405, filed on Sep. 21, 2017.

(51) Int. Cl.
*C01B 21/064* (2006.01)
*B82Y 30/00* (2011.01)
*B82Y 40/00* (2011.01)

(52) U.S. Cl.
CPC ...... *C01B 21/0646* (2013.01); *C01B 21/0648* (2013.01); *B82Y 30/00* (2013.01);
(Continued)

(58) Field of Classification Search
None
See application file for complete search history.

(56) References Cited

U.S. PATENT DOCUMENTS 8,703,023 B2    4/2014  Sainsbury et al.
2009/0214799 A1  8/2009  Simard et al.
(Continued)

FOREIGN PATENT DOCUMENTS

CA    2877060 C      10/2014
JP    2013538887 A   10/2013
(Continued)

OTHER PUBLICATIONS

Kumar et al.; Copper Catalyzed Growth of Hexagonal Boron Nitride Nanotubes on Tungsten Substrate; CrystEngComm; 20, 2713-2719; Apr. 3, 2018.*

(Continued)

*Primary Examiner* — Guinever S Gregorio

(57) ABSTRACT

The present application relates to boron nitride nanotube (BNNT)-nanoparticle composites, to methods of preparing such composites and their use, for example, in metal/ceramic matrix composites and/or macroscopic assemblies. For example, the methods comprise subjecting a source of hydrogen, a source of boron, a source of nitrogen and a nanoparticle precursor to a stable induction thermal plasma and cooling the reaction mixture to obtain the composite.

16 Claims, 9 Drawing Sheets

(52) U.S. Cl.
CPC ........... *B82Y 40/00* (2013.01); *C01P 2002/82* (2013.01); *C01P 2002/84* (2013.01); *C01P 2004/04* (2013.01); *C01P 2004/13* (2013.01)

(56) References Cited

U.S. PATENT DOCUMENTS

| | | |
|---|---|---|
| 2013/0064750 A1 | 3/2013 | Zettl |
| 2015/0033937 A1 | 2/2015 | Lashmore et al. |
| 2015/0125374 A1 | 5/2015 | Smith et al. |
| 2015/0125380 A1 | 5/2015 | Biris et al. |
| 2016/0083253 A1 | 3/2016 | Kim et al. |

FOREIGN PATENT DOCUMENTS

| | | | | |
|---|---|---|---|---|
| JP | 2016521240 A | | 7/2016 | |
| JP | 2017132662 A | * | 8/2017 | |
| WO | WO-2014169382 A1 | * | 10/2014 | ............ B82Y 30/00 |
| WO | 2015200496 A1 | | 12/2015 | |
| WO | 2017136574 A1 | | 8/2017 | |

OTHER PUBLICATIONS

Gao et al.; Noncovalent Functionalization of Boron Nitride Nanotubes in Aqueous Media Opens Application Roads in Nanobiomedicine; Nanobiomedicine, vol. 1; Jan. 2014.*
Zhi et al.; Boron Nitride Nanotubes: Functionalization and Composites; Journal of Materials Chemistry; 18, 3900-3908; 2008.*
Zettl et al.; Self-Assembly of Gold Nanoparticles at the Surface of Amine- and Thiol-Functionalized Boron Nitride Nanotubes; J. Phys. Chem. C; 111, 12992-12999; 2007.*
Dai X.-J., et al. (2011) Controlled Surface Modification of Boron Nitride Nanotubes. Nanotechnology. 22, 245301. 8 pages.
Ikuno T., et al. (2007) Amine-Functionalized Boron Nitride Nanotubes. ScienceDirect. Solid State Communications. 142, 643-646.
Malik R., et al. (2013) Atmospheric Pressure Plasma Functionalization of Dry-Spun Multi-Walled Carbon Nanotubes Sheets and its Application in CNT-Polyvinyl Alcohol (PVA) Composites. Mater. Res. Soc. Symp. Proc. 1574. DOI: 10.1557/opl.2013.701.
Park O.-K., et al. (2015) Effect of Oxygen Plasma Treatment on the Mechanical Properties of Carbon Nanotube Fibers. Materials Letters. 156, 17-20.
Chen H., et al. (2007) Eu-Doped Boron Nitride Nanotubes as a Nanometer-Sized Visible-Light Source. Adv. Mater. 19, 1845-1848.
Chen Y.-J., et al. (2007) Tunable Electric Conductivities of Au-Doped Boron Nitride Nanotubes. NANO: Brief Reports and Reviews. 2(6), 367-372.
Chen H., et al. (2008) Nano Au-Decorated Boron Nitride Nanotubes: Conductance Modification and Field-Emission Enhancement. Applied Physics Letters. 92, 243105. 4 pages.
Chen H., et al. (2008) Rare-Earth Doped Boron Nitride Nanotubes. Materials Science and Engineering B. 146, 189-192.
Chen Z.-G., et al. (2008) Self-Assembly and Cathodoluminescence of Microbelts from Cu-Doped Boron Nitride Nanotubes. ACS Nano. 2(8), 1523-1532.
Cho Y.-J., et al. (2009) Electronic Structure of Si-Doped BN Nanotubes Using X-ray Photoelectron Spectroscopy and First-Principles Calculation. Chem. Mater. 21, 136-143.
Fathalizadeh A., et al. (2014) Scaled Synthesis of Boron Nitride Nanotubes, Nanoribbons, and Nanococoons Using Direct Feedstock Injection into an Extended-Pressure, Inductively-Coupled Thermal Plasma. Nano Letters. dx.doi.org/10.1021/nl5022915.
Gao Z., et al. (2011) Nucleotide-Assisted Decoration of Boron Nitride Nanotubes with Semiconductor Quantum Dots Endows Valuable Visible-Light Emission in Aqueous Solution. Soft Matter. 7, 8753-8756.
Georgakilas V., et al. (2007) Decorating Carbon Nanotubes with Metal or Semiconductor Nanoparticles. Journal of Materials Chemistry. 17, 2679-2694.
Han W.-Q., et al. (2003) Functionalized Boron Nitride Nanotubes with a Stannic Oxide Coating: A Novel Chemical Route to Full Coverage. J. Am. Chem. Soc. 125, 2062-2063.
Huang Y., et al. (2010) BN Nanotubes Coated with Uniformly Distributed Fe304 Nanoparticles: Novel Magneto- Operable Nanocomposites. Journal of Materials Chemistry. 20, 1007-1011.
Kim K.-S., et al. (2014) Hydrogen-Catalyzed, Pilot-Scale Production of Small-Diameter Boron Nitride Nanotubes and Their Macroscopic Assemblies. ACS Nano. 8(6), 6211-6220.
Lahiri D., et al. (2013) Boron Nitride Nanotubes Reinforced Aluminum Composites Prepared by Spark Plasma Sintering: Microstructure, Mechanical Properties and Deformation Behavior. Materials Science and Engineering: A. 574, 149-156.
Lee C.-H., et al. (2013) Room-Temperature Tunneling Behavior of Boron Nitride Nanotubes Functionalized with Gold Quantum Dots. Adv. Mater. 25, 4544-4548.
Lee C.-M., et al. (2006) Synthesis of Boron Nitride Nanotubes by Arc-Jet Plasma. Current Applied Physics. 6, 166-170.
Li R., et al. (2014) Non-Covalent Surface Modification of Boron Nitride Nanotubes for Enhanced Catalysis. Chem. Commun. 50, 225-227.
Oh S.-I., et al. (2012) Fabrication of Carbon Nanofiber Reinforced Aluminum Alloy Nanocomposites by a Liquid Process. Journal of Alloys and Compounds. 542, 111-117.
Oku T., et al. Synthesis, Atomic Structures and Electronic States of Boron Nitride Nanocage Clusters and Nanotubes. Institute of Scientific and Industrial Research. Osaka University. Osaka, Japan. Undated manuscript.
Pham T., et al. (2015) A Universal Wet-Chemistry Route to Metal Filling of Boron Nitride Nanotubes. Nano Letters. DOI: 10.1021/acs.nanolett.5b03874.
Ponraj S.-B., et al. (2014) Fabrication of Boron Nitride Nanotube-Gold Nanoparticle Hybrids Using Pulsed Plasma in Liquid. Langmuir. 30,10712-10720.
Tang C., et al. (2003) Boron Nitride Nanotubes Filled with Ni and NiSi2 Nanowires in Situ. J. Phys. Chem. B. 107, 6539-6543.
Terrones M., et al. (2007) Pure and Doped Boron Nitride Nanotubes. Materials Today. 10(5), 30-38.
Wei X., et al. (2010) Post-Synthesis Carbon Doping of Individual Multiwalled Boron Nitride Nanotubes via Electron-Beam Irradiation. J. Am. Chem. Soc. 132, 13592-13593.
Yamaguchi M., et al. (2012) Synthesis, Structural Analysis and in Situ Transmission Electron Microscopy Mechanical Tests on Individual Aluminum Matrix/Boron Nitride Nanotube Nanohybrids. Acta Materialia. 60, 6213-6222.
Yu Y., et al. (2015) A Facile Strategy for the Functionalization of Boron Nitride Nanotubes with Pd Nanoparticles. Journal of Nanomaterials. Article ID 310214. http://dx.doi.org/10.1155/2015/310214. 5 pages.
Zhi C., et al. (2005) Immobilization of Proteins on Boron Nitride Nanotubes. J. Am. Chem. Soc. 127, 17144-17145.
Zhi C., et al. (2006) SnO2 Nanoparticle-Functionalized Boron Nitride Nanotubes. J. Phys. Chem. B. 110, 8548-8550.
Office Action on Korean Application No. 10-2020-7007327 dated Jun. 27, 2023.
English Translation of Office Action on Korean Application No. 10-2020-7007327 dated Jun. 27, 2023.
Office Action on Korean Application No. 10-2020-7007327 dated Jan. 30, 2024.
English Translation of Office Action on Korean Application No. 10-2020-7007327 dated Jan. 30, 2024.
Notice of Reasons for Rejection dated Apr. 26, 2022.
English Translation of Notice of Reasons for Rejection dated Apr. 26, 2022.
English Abstract of JP 2013538887.
English Abstract of JP 2016521240.
English Abstract of JP 2017132662.
Partial Supplementary European Search Report dated May 7, 2021.
Extended European Search Report dated Jun. 18, 2021.
Tiano, A. L. et al. (2014) Boron Nitride Nanotube: Synthesis and Applications. Proceedings of SPIE. 9060. 906006-1-906006-19. 19 pages.

(56) References Cited

OTHER PUBLICATIONS

Office Action on Korean Application No. 10-2020-7007327 dated Jun. 26, 2024.
English Translation of Office Action on Korean Application No. 10-2020-7007327 dated Jun. 26, 2024.
Office Action on European Application No. 18858873.5 dated Sep. 27, 2024.
Office Action on Canadian Application No. 3,076,087 dated Oct. 29, 2024.

* cited by examiner

BORON NITRIDE NANOTUBE (BNNT)-NANOPARTICLE COMPOSITES, METHODS FOR THE PREPARATION THEREOF AND THEIR MACROSCOPIC ASSEMBLIES

CROSS-REFERENCE TO RELATED APPLICATIONS

The present application is a national stage entry of International application number PCT/CA2018/051157, filed on Sep. 18, 2018, which claims the benefit of priority from U.S. provisional application No. 62/561,405 filed on Sep. 21, 2017, the contents of each of which are incorporated herein by reference in their entirety.

FIELD

The present application relates to boron nitride nanotube (BNNT)-nanoparticle composites, to methods of preparing such composites and their use, for example, in metal/ceramic matrix composites and/or macroscopic assemblies.

BACKGROUND

Boron nitride nanotubes (BNNTs) are rolled-up cylinders made of a single layer or a few layers of hexagonal boron nitride (h-BN) sheets. Since their first synthesis in 1995, BNNTs have been studied, for example, due to their unique properties such as low density with high mechanical strength, electrical insulation with high thermal conductivity, piezoelectricity, good radiation shield ability, and superb thermal and/or chemical resistance.

BNNT-ceramic or metal nanocomposites may, for example, be useful for the development of lightweight but hard materials with a potential to impact a range of engineering sectors such as aerospace and armor materials. However, developments of such composite materials have significantly suffered from the low reactivity of pristine BNNTs towards metal or ceramic matrices. For example, Yamaguchi et al.[1] fabricated BNNT/aluminum matrix composite nanohybrids through magnetron sputtering of Al onto dispersed multiwalled BNNTs. While the aluminum phase coated the BNNTs after the deposition, there was only a weak interfacial bond between the metals and the BNNTs.

Developments of such composite materials have also significantly suffered from the complexity associated with BNNT surface modification for achieving higher reactivity. At present, improvement of BNNT reactivity is mostly achieved by two-step procedures; BNNTs are firstly synthesized by arc discharge, laser vaporization, ball milling, CVD, or thermal plasma jet methods, and then their surfaces are subsequently modified with reactive chemical species or metal/ceramic nanoparticles through substitutional reactions (e.g. doping), physical vapor depositions, or complicated chemical functionalization. A common drawback of such processes is that they are intrinsically two-step procedures. Thus, the processes can be time, energy, equipment, and/or chemical extensive.

For example, Han and Zettl[2] coated BNNTs with a layer containing $SnO_2$ nanoparticles by stirring the already-synthesized BNNTs inside a solution comprising $SnCl_2$. Similarly, Zhi et al.[3] synthesized BNNTs then functionalized them with $SnO_2$ nanoparticles using a wet chemistry method. Chen et al.[4] doped europium into the skeleton of BNNTs prepared using a ball milling process. Huang et al.[5] prepared BNNTs coated with $Fe_3O_4$ nanoparticles using an ethanol-thermal process. Yu et al.[6] functionalized BNNTs with Pd nanoparticles in a procedure which first comprised synthesizing BNNTs by a ball milling and subsequent high temperature annealing process then subsequently refluxing a dispersion of the BNNTs and SDS with a saturated solution of $PdCl_2$.

The development of alternative processes which comprise in-situ surface modification of BNNTs has been challenging because the presence of foreign species during the BNNT synthesis usually has detrimental effects on the nucleation and growth of BNNTs with high quality and high purity.

Some methods of preparing BNNTs comprise using a metal catalyst to facilitate BNNT growth serving as seeds for BNNT nucleation. For example, Lee et al.[7] disclose preparing BNNTs using an arc-jet plasma which resulted from the chemical reaction of a precursor material of hexagonal boron nitride with catalytic metal powders of Ni and Y introduced into the hot arc-jet plasma flame. US Patent Application Publication No. 2013/0064750 discloses a method for producing chemical nanostructures having multiple elements such as BNNTs which comprises introducing the multiple elements into a plasma jet. The application generally discloses the use of a catalyst such as fine tungsten powder. Canadian Patent No. 2,877,060 discloses a process for producing BNNTs comprising providing one or more sources of boron, nitrogen and hydrogen to a stable induction thermal plasma. This patent discloses that it is unnecessary to use metal catalysts in such processes. However, metal catalysts may optionally be included, and Example 2a discloses the use of 2.0 at. % nickel (Ni, 99.5%, <1 ppm particle size) as a metal catalyst. In such processes, the metal catalyst nanoparticle is in the interior of the BNNTs thereby produced.

SUMMARY

A facile and scalable strategy for "one-pot" synthesis of BNNT-metal/ceramic composites (i.e., BNNTs functionalized on an external surface with ceramic or metal nanoparticles) using a high temperature plasma process is described herein. In the experiments described hereinbelow, a mixture of h-BN and metal or ceramic powders was introduced into an induction thermal plasma to produce precursors for BNNTs and nano-sized metal or ceramic particles at the same time. As the temperature cooled down, BNNTs and metal or ceramic clusters were formed from their precursors and BNNTs were subsequently functionalized by those nanoparticles in-situ. Such materials may, for example, possess higher reactivity towards metal or ceramic matrices. To control the reactivity, the degree of surface modification may be adjusted by controlling the content of metal or ceramic particles in the feedstock. For instance, the amount of metal or ceramic particles was up to 50 wt. % in the case of AlN without a significant change in the growth of the BNNTs. In contrast, loading of foreign particles in the feedstock up to 50 wt. % has been very challenging in existing in-situ surface modification methods. Growth of BNNTs and their subsequent surface modification take place simultaneously in just one reactor within a very short time (less than about 100 msec). Further treatment of such products to obtain materials which are more reactive towards metal or ceramic matrices is unnecessary which, may, for example greatly reduce time and/or costs.

Accordingly, the present application includes a method for preparing a boron nitride nanotube (BNNT)-nanoparticle composite, the method comprising:

subjecting a source of hydrogen, a source of boron, a source of nitrogen and a nanoparticle precursor to a stable induction thermal plasma to form a reaction mixture in the plasma; and cooling the reaction mixture to obtain the BNNT-nanoparticle composite.

The present application also includes a composite comprising boron nitride nanotubes (BNNTs) and nanoparticles, the nanoparticles being formed of a non-catalytic metal or a non-catalytic metal ceramic, and located outside of the BNNTs. In some embodiments, the boron nitride nanotube (BNNT)-nanoparticle composites of the present application are prepared by a method of preparing BNNT-nanoparticle composites of the present application.

The present application also includes a yarn comprising a boron nitride nanotube (BNNT)-nanoparticle composite of the present application.

The present application also includes a buckypaper comprising a boron nitride nanotube (BNNT)-nanoparticle composite of the present application.

The present application also includes a thin film comprising a boron nitride nanotube (BNNT)-nanoparticle composite of the present application.

The present application also includes a metal/ceramic matrix composite comprising a boron nitride nanotube (BNNT)-nanoparticle composite of the present application embedded in a matrix of the metal or the ceramic.

Other features and advantages of the present application will become apparent from the following detailed description. It should be understood, however, that the detailed description and the specific examples while indicating embodiments of the application are given by way of illustration only, since various changes and modifications within the spirit and scope of the application will become apparent to those skilled in the art from this detailed description.

BRIEF DESCRIPTION OF THE DRAWINGS

The present application will now be described in greater detail with reference to the drawings in which.

DETAILED DESCRIPTION

I. Definitions

Figure 1:
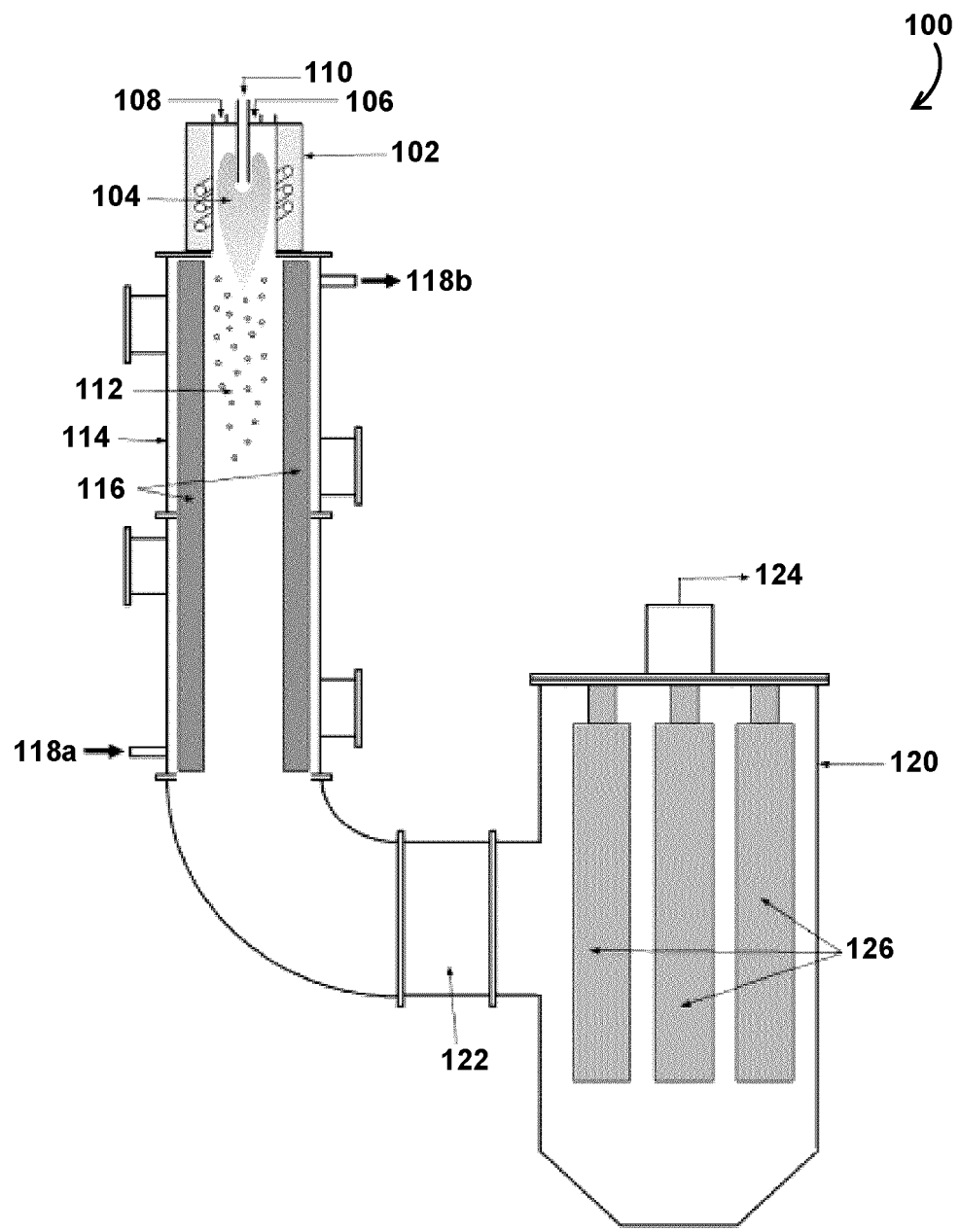
FIG. 1 is a schematic diagram of an induction plasma reactor for preparing a boron nitride nanotube (BNNT)-nanoparticle composite according to exemplary embodiments of the methods of the present application.

Unless otherwise indicated, the definitions and embodiments described in this and other sections are intended to be applicable to all embodiments and aspects of the present application herein described for which they are suitable as would be understood by a person skilled in the art.

In understanding the scope of the present application, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. The term "consisting" and its derivatives, as used herein, are intended to be closed terms that specify the presence of the stated features, elements, components, groups, integers, and/or steps, but exclude the presence of other unstated features, elements, components, groups, integers and/or steps. The term "consisting essentially of", as used herein, is intended to specify the presence of the stated features, elements, components, groups, integers, and/or steps as well as those that do not materially affect the basic and novel characteristic(s) of features, elements, components, groups, integers, and/or steps.

Terms of degree such as "substantially", "about" and "approximately" as used herein mean a reasonable amount of deviation of the modified term such that the end result is not significantly changed. These terms of degree should be construed as including a deviation of at least ±5% of the modified term if this deviation would not negate the meaning of the word it modifies.

The term "and/or" as used herein means that the listed items are present, or used, individually or in combination. In effect, this term means that "at least one of" or "one or more" of the listed items is used or present.

As used in this application, the singular forms "a", "an" and "the" include plural references unless the content clearly dictates otherwise. For example, an embodiment including "a source of nitrogen" should be understood to present certain aspects with one source of nitrogen or two or more additional sources of nitrogen. In embodiments comprising an "additional" or "second" component, such as an additional or second source of nitrogen, the second component as used herein is chemically different from the other components or first component. A "third" component is different from the other, first, and second components, and further enumerated or "additional" components are similarly different.

The term "suitable" as used herein means that the selection of specific reagents or conditions will depend on the reaction being performed and the desired results, but nonethe-less, can generally be made by a person skilled in the art once all relevant information is known.

The term "boron nitride nanotube" and the abbreviation "BNNT" as used herein refer to a polymorph of boron nitride that is in the form of a hollow nanotube which can be single-walled, double-walled or multi-walled and in which the walls are made up of six-membered rings of alternating boron and nitrogen atoms connected together in a graphene-like configuration.

The term "buckypaper" as used herein refers to a material made up of intertwined BNNTs that is in the form of a free-standing sheet. In some embodiments, the buckypaper is 20 µm or greater in thickness.

The term "thin film" as used herein refers to a material made up of intertwined BNNTs that is deposited on a surface. In some embodiments, the thin film is less than 20 µm in thickness.

The term "non-catalytic" as used herein in reference to a metal or a metal ceramic means that the metal or metal ceramic does not act as a catalyst (seed) for the growth of boron nitride nanotubes (BNNTs).

The term "halide" as used herein refers to a compound comprising one or more halogen atoms such as F, Cl, Br or I.

The term "doped" as used herein in reference to BNNTs being functionalized by nanoparticles means that the nanoparticles are attached to the surface of the BNNTs by replacement of a constituent element (i.e. B or N).

The term "decorated" as used herein in reference to BNNTs being functionalized by nanoparticles means that the nanoparticles are attached to the surface of the BNNTs through chemical bonds (e.g. through covalent bonding) and/or physical interactions (e.g. through van der Waals forces).

II. Methods

Feedstock comprising blends of either aluminum nitride or copper metal and hexagonal boron nitride (h-BN) has been fed into a boron nitride nanotube (BNNT) synthesis apparatus that includes a plasma torch, reactor, filtration chamber and powder feeder and the one-pot synthesis of BNNT-AlN and BNNT-Cu hybrids, respectively was demonstrated.

Accordingly, the present application includes a method for preparing a boron nitride nanotube (BNNT)-nanoparticle composite, the method comprising:

subjecting a source of hydrogen, a source of boron, a source of nitrogen and a nanoparticle precursor to a stable induction thermal plasma to form a reaction mixture in the plasma; and cooling the reaction mixture to obtain the BNNT-nanoparticle composite.

A schematic diagram of a suitable induction plasma reactor 100 for the methods of the present application is shown in FIG. 1.

In an embodiment, the reactor comprises an about 2-5 MHz radio frequency (RF) inductively coupled plasma torch 102 (e.g. a Tekna PL-50 from Tekna Plasma Systems, Inc.) that can produce a high temperature thermal plasma jet 104 in a plasma zone of the reactor. A stable plasma can be maintained, for example, by heating a central inert plasma gas (e.g. argon) to a suitable high temperature (e.g. about 1,000 K to about 10,000 K, about 7,000 to about 9,000 K or about 8000 K). In an embodiment, as shown in FIG. 1, the central inert plasma gas is provided to the plasma zone through central gas inlet 106. In some embodiments, as shown in FIG. 1, a sheath gas is also introduced into the plasma zone through sheath gas inlet 108, the sheath gas assisting in stabilizing the thermal plasma. In some embodiments, the sheath gas comprises an inert gas (e.g. argon) and/or one or more reactant gases that provide a gaseous source of boron, nitrogen and/or hydrogen. In some embodiments, as shown in FIG. 1, solid feedstock (e.g. the nanoparticle precursor and boron and/or nitrogen-containing feedstock such as metal-free h-BN) is provided to the thermal plasma through feedstock inlet 110. In some embodiments, the feedstock is carried by a carrier gas (e.g. an inert gas such as argon). In some embodiments, where the feedstock is a powder, a powder feeder (not shown) is used to inject the feedstock into the plasma zone.

In some embodiments, the solid feedstock and the reactant gases are continuously injected into the high temperature induction plasma jet 104 to form a reaction mixture of boron, nitrogen and nanoparticle precursor species. In some embodiments, for example, where the boron and nitrogen source is h-BN, the h-BN can evaporate almost immediately (e.g. <10 ms) in the plasma releasing boron vapors as well as nitrogen. In some embodiments, the nitrogen-containing reactant gas injected into the plasma also generates reactive nitrogen radicals which may, for example, improve nitrogen reactivity toward boron for the formation of BNNTs. Injected nanoparticle precursors are also evaporated immediately by the high temperature plasma and dissociated into their elemental species.

In some embodiments, as shown in FIG. 1, the reaction mixture is carried from the plasma zone into a reaction zone 112 in a reaction chamber 114, which is in fluid communication with the plasma zone. In some embodiments, the reaction zone contains a refractory liner 116 for maintaining the process temperature and controlling the temperature gradient. In the reaction zone, boron vapors are cooled rapidly through the plasma jet expansion and nano-sized boron droplets are formed as the temperature cools down in the reactor. While not wishing to be limited by theory, BNNTs grow continuously from such boron droplets by adsorbing nitrogen species formed in the plasma. Based on the widely accepted "root growth mechanism" of BNNTs, the effective generation of boron vapors and a controlled cooling of the vapors inside the reactor lead to the nucleation of small diameter boron droplets, which are precursors to small diameter BNNTs. While not wishing to be limited by theory, interactions between such boron droplets and the nitrogen species lead, for example, to rapid growth of BNNTs from the boron droplets. As the temperature cools down further, metal or ceramic vapors may then be supersaturated to form the nucleus of their nanoparticles and they can continue to grow to tens of nm in size through condensation and/or coagulation processes. The formed nanoparticles can be attached to the exterior surface of preformed BNNTs in-situ.

As the BNNTs and nanoparticles pass through the reaction chamber 114 their growth slows and is then terminated.

While not wishing to be limited by theory, the growth process occurs over the whole of the reaction pathway from when the vapors enter the reaction chamber and begin to nucleate to when the formed BNNTs and nanoparticles leave the reaction chamber. While not wishing to be limited by theory, initial cooling of the vapors in the reaction chamber permits nucleation of boron droplets that can then react with nitrogen species to start the formation of BNNTs. BNNTs and nanoparticles continue to grow in their passage through the reaction chamber. As the reaction mixture cools further in the reaction chamber, the continued growth of the BNNTs and nanoparticles is ultimately terminated. In some embodiments of the application, the reaction chamber is cooled with a water jacket. In the embodiment shown in FIG. 1, water flows into the water jacket through water inlet 118*a* and out through water outlet 118*b*.

In some embodiments, as shown in FIG. 1, BNNTs and nanoparticles formed during the passage through the reaction chamber are collected using a vacuum filtration unit that comprises a filtration chamber 120 in fluid communication with the reaction chamber through a pipe 122. In some embodiments, as shown in FIG. 1, a vacuum pump connected to vacuum port 124 draws BNNT-nanoparticle composite-laden gases through porous filters 126 in the filtration chamber, whereupon the BNNT-nanoparticle composites are deposited on the filters while the gases are drawn out. In some embodiments, the composites are collected off the porous filters 126 and/or off of the pipe 122.

The stable induction plasma may be generated using any suitable means, the selection of which can be made by a person skilled in the art. In an embodiment, the stable induction plasma is generated using an induction plasma torch, for example, a radio frequency (RF) inductively coupled thermal plasma torch. In some embodiments, the stable plasma is formed from a plasma gas in a plasma zone. The plasma gas may be any suitable plasma gas, the selection of which can be made by a person skilled in the art. In an embodiment, the plasma gas is argon, helium or a mixture thereof. In another embodiment, the plasma gas is argon.

The temperature of the stable induction plasma is any suitable temperature. In an embodiment, the stable induction thermal plasma has a plasma temperature of about 1,000 K to about 10,000 K. In another embodiment, the temperature at the plasma core is about 7,000 to about 9,000 K or about 8,000 K.

The pressure of the stable induction plasma, and therefore the pressure to which the reaction mixture is subjected is any suitable pressure. In an embodiment, the reaction mixture is formed in the plasma at a pressure of less than about 2 atm or less than about 1.9 atm. In another embodiment, the reaction mixture is formed in the plasma at a pressure of greater than about 0.6 atm, greater than about 0.8 atm or greater than about 0.95 atm. In a further embodiment, the reaction mixture is formed in the plasma at a pressure of from about 0.8 atm to about 1.9 atm, about 0.9 atm to about 1.9 atm, about 0.95 atm to about 1.9 atm, about 0.9 atm to about 1 atm or about 0.95 atm to about 1 atm.

The source of boron is any suitable source. In an embodiment, the source of boron is boron nitride, elemental boron, borane, ammonia borane (also known as borazane), borazine, a boron trihalide or mixtures thereof. In another embodiment, the source of boron is boron nitride. In a further embodiment of the present application, the boron nitride is hexagonal boron nitride (h-BN).

The source of nitrogen is any suitable source. In an embodiment, the source of nitrogen is boron nitride, $N_2$, $NH_3$, $NH_4OH$, ammonia borane (also known as borazane), borazine or mixtures thereof. In another embodiment, at least one source of nitrogen is a gas. In a further embodiment, at least one source of nitrogen is $N_2$. It is an embodiment that the source of nitrogen is a mixture of boron nitride and $N_2$. In another embodiment, the boron nitride is h-BN.

The source of hydrogen is any suitable source. In an embodiment, the source of hydrogen is $H_2$, $NH_3$, $NH_4OH$, borane, ammonia borane (also known as borazane), borazine or mixtures thereof. In another embodiment, at least one source of hydrogen is a gas. In a further embodiment, the source of hydrogen is $H_2$.

The nanoparticle precursor will depend, for example, on the composition of the desired nanoparticle in the boron nitride nanotube (BNNT)-nanoparticle composite and the selection of a suitable nanoparticle precursor to obtain such a nanoparticle can be made by the person skilled in the art.

In an embodiment, the nanoparticle precursor is a metal ceramic. In an embodiment, the nanoparticle precursor comprises, consists essentially of or consists of aluminum nitride (AlN), gallium nitride (GaN), tantalum nitride (TaN), tungsten nitride ($W_2N$, WN, $WN_2$), magnesium nitride ($Mg_3N_2$) or titanium nitride (TiN). In another embodiment, the nanoparticle precursor comprises, consists essentially of or consists of AlN or TiN. In a further embodiment, the nanoparticle precursor comprises, consists essentially of or consists of AlN.

In an embodiment, the nanoparticle precursor is a metallic element or alloy. In another embodiment, the metallic element or alloy has a melting point of less than about 1,200° C. In a further embodiment of the present application, the nanoparticle precursor is a metallic element. In another embodiment, the metallic element has a melting point of less than about 1,200° C. In a further embodiment, the nanoparticle precursor comprises, consists essentially of or consists of copper metal ($Cu^0$), aluminum metal ($Al^0$), silver metal ($Ag^0$), gold metal ($Au^0$), gallium metal ($Ga^0$) or magnesium metal ($Mg^0$). In a further embodiment, the nanoparticle precursor comprises, consists essentially of or consists of copper metal ($Cu^0$) or aluminum metal ($Al^0$). In another embodiment, the nanoparticle precursor comprises, consists essentially of consists of copper metal ($Cu^0$).

In an embodiment, the source of boron is hexagonal boron nitride (h-BN); the source of nitrogen is a mixture of hexagonal boron nitride (h-BN) and $N_2$; and the source of hydrogen is $H_2$. In another embodiment, the $N_2$ and $H_2$ are introduced into the stable induction plasma in a sheath gas. In another embodiment, the sheath gas further comprises argon. It is an embodiment that the hexagonal boron nitride (h-BN) and the nanoparticle precursor are introduced into the stable induction plasma as a powder.

In an embodiment, the ratio by weight of the h-BN to the nanoparticle precursor is from about 99:0.1 to about 50:50. In another embodiment of the present application, the ratio by weight of the h-BN to the nanoparticle precursor is from about 93.5:6.5 to about 50:50. In a further embodiment, the ratio by weight of the h-BN to the nanoparticle precursor is about 93.5:6.5. In another embodiment, the ratio by weight of the h-BN to the nanoparticle precursor is about 50:50.

In an embodiment, cooling the reaction mixture comprises cooling in a reaction zone downstream of the stable induction plasma.

III. Composites, Macroscopic Assemblies and Uses

Boron nitride nanotube (BNNT)-AlN composites were prepared and fabrication of their macroscopic assemblies such as buckypapers has also been carried out. BNNT-Cu composites were also prepared. In contrast to metal particles used as seeds for the growth of BNNTs, which are found on the interior of BNNTs once synthesis is complete, the AlN or Cu nanoparticles, as the case may be, were observed to functionalize the exterior surface of the BNNTs.

Accordingly, the present application includes a composite comprising boron nitride nanotubes (BNNTs) and nanoparticles, the nanoparticles being formed of a non-catalytic metal or a non-catalytic metal ceramic, and located outside of the BNNTs. In some embodiments, the boron nitride nanotube (BNNT)-nanoparticle composites of the present application are prepared by a method of preparing BNNT-nanoparticle composites of the present application.

It will be appreciated by a person skilled in the art that embodiments relating to the composites comprising BNNTs of the present application may be varied as described herein in the embodiments for the methods for preparing BNNT-nanoparticle composites of the present application.

In an embodiment, the nanoparticles are metal ceramic nanoparticles. In another embodiment, the nanoparticles comprise, consist essentially of or consist of aluminum nitride (AlN), gallium nitride (GaN), tantalum nitride (TaN), tungsten nitride ($W_2N$, WN, $WN_2$), magnesium nitride ($Mg_3N_2$) or titanium nitride (TiN). In another embodiment, the nanoparticles comprise, consist essentially of or consist of aluminum nitride (AlN) or titanium nitride (TiN). In a further embodiment, the nanoparticles comprise, consist essentially of or consist of AlN.

In an embodiment, the nanoparticles are formed of a metallic element or alloy. In another embodiment, the metallic element or alloy has a melting point of less than about 1,200° C. In a further embodiment, the nanoparticles comprise, consist essentially of or consist of a metallic element. In another embodiment, the metallic element has a melting point of less than about 1,200° C. In another embodiment, the nanoparticles comprise, consist essentially of or consist of copper metal ($Cu^0$), aluminum metal ($Al^0$), silver metal ($Ag^0$), gold metal ($Au^0$), gallium metal ($Ga^0$) or magnesium metal ($Mg^0$). In a further embodiment, the nanoparticles comprise, consist essentially of or consist of copper metal ($Cu^0$) or aluminum metal ($Al^0$). In another embodiment, the nanoparticles comprise, consist essentially of or consist of copper metal ($Cu^0$).

In another embodiment, the nanoparticles are aluminum nitride nanoparticles or copper nanoparticles.

Because the nanoparticles do not participate in the nucleation and growth of BNNTs in the methods of the present application, the diameter of the BNNTs was not significantly different than BNNTs produced by a similar method in absence of the nanoparticle precursors. Accordingly, in an embodiment of the present application, the boron nitride nanotubes (BNNTs) have an average diameter of less than 10 nm. In another embodiment, the BNNTs have an average diameter of about 1 to about 10 nm. In a further embodiment, the BNNTs have an average diameter of about 3 nm to about 7 nm or about 5 nm.

In an embodiment, the BNNTs are multi-walled, single-walled or combinations thereof. In another embodiment, the BNNTs are multi-walled. In a further embodiment, the BNNTs are a combination of multi-walled and single-walled. In a further embodiment, the BNNTs are single-walled.

The average diameter of the nanoparticles ranges from a few nm to tens of nm. Accordingly, in an embodiment, the nanoparticles have an average diameter of about 1 nm to about 99 nm or about 3 nm to about 50 nm.

In some embodiments, the BNNTs are doped by the nanoparticles, decorated by the nanoparticles or combinations thereof. In another embodiment, the BNNTs are doped by the nanoparticles. In a further embodiment, the BNNTs are decorated by the nanoparticles. In another embodiment, the BNNTs are functionalized by the nanoparticles by a combination of doping and decoration.

The present application also includes a yarn comprising a boron nitride nanotube (BNNT)-nanoparticle composite of the present application.

The present application also includes a buckypaper comprising a boron nitride nanotube (BNNT)-nanoparticle composite of the present application.

The present application also includes a thin film comprising a boron nitride nanotube (BNNT)-nanoparticle composite of the present application.

Yarns, buckypapers and thin films comprising the BNNT-nanoparticle composites of the present application can be prepared using methods previously used for pristine BNNTs, for example, as disclosed by Kim et al.[8]

The composites comprising boron nitride nanotubes (BNNTs) and nanoparticles of the present application may be useful, for example, in preparing metal/ceramic matrix composites as they may possess higher reactivity towards metal and/or ceramic matrices than pure BNNTs. Accordingly, the present application also includes a metal/ceramic matrix composite comprising a composite comprising BNNTs and nanoparticles of the present application embedded in the metal or the ceramic. In an embodiment, the metal/ceramic matrix composite is a metal matrix composite and the composite comprising BNNTs and nanoparticles is embedded in the metal. In an embodiment, the metal is aluminum metal, titanium metal or an alloy comprising aluminum metal and titanium metal (e.g. Ti6Al4V). In another embodiment, the BNNT-nanoparticle composite is a BNNT-AlN composite. In another embodiment, the metal/ceramic matrix composite is a ceramic matrix composite and the composite comprising BNNTs and nanoparticles is embedded in the ceramic. In an embodiment, the ceramic is alumina ($Al_2O_3$) or boron carbide ($B_4C$).

Such metal/ceramic matrix composites can be prepared using any suitable technique. In some embodiments, the metal/ceramic matrix composite is prepared by a process comprising hot isostatic pressing (HIP).

The term "hot isostatic pressing" or the abbreviation "HIP" as used herein refers to a process which comprises the steps of filling a high pressure containment vessel with the desired precursors and subjecting them to both elevated temperature and high pressure followed by cooling down to room temperature at a slow, controlled cooling rate thereby consolidating the precursors to obtain the metal/ceramic matrix composite. In an embodiment, the metal/ceramic matrix composite is a metal matrix composite and the precursors are a combination of the BNNT-nanoparticle composite and the metal in powdered form. In another embodiment, the metal/ceramic matrix composite is a ceramic matrix composite and the precursors are a combination of the BNNT-nanoparticle composite and the ceramic in powdered form.

BNNT-reinforced ceramic or metal nanocomposites may be useful, for example, due to their potential for combining ultra-strong impact resistance with a light weight. Accordingly, the present application also includes a use of the BNNT-nanoparticle composites of the present application for the preparation of a BNNT-reinforced metal or ceramic composite for structural materials, ballistic shields, armor materials, neutron shields, lightweight vehicles and/or aircraft.

The following non-limiting examples are illustrative of the present application:

EXAMPLES

Example 1

Preparation of Boron Nitride Nanotubes (BNNTs) Functionalized with Aluminum Nitride Nanoparticles An induction plasma reactor was used as described in Canadian Patent No. 2,877,060. The feedstock used in the present experiments was a mixture of h-BN and metal/ceramic powder. In particular, pure h-BN powder (99.5%, avg. particle size 70 nm, MK-hBN-N70, M K Impex Corp.) was mixed with the desired ceramic or metal powder (AlN-6.5 wt. %, AlN-50 wt. % or Cu-6.5 wt. %) using a roll mixer. Then the feedstock mixture was sieved (300 μm) with a brush and baked at 100° C. overnight prior to being injected into the induction plasma reactor.

During the process, the feedstock mixture was injected into the hot plasma jet (about 8,000 K) and decomposed immediately into the constituent elements (e.g., B, N, Al or Cu). While not wishing to be limited by theory, simulation results suggested the vaporization time for hBN to be less than 10 ms. As the temperature was cooled down, boron droplets were formed and BNNTs continued to grow from those boron droplets. At the same time, metal/ceramic particles can also nucleate from their vapors and continue to grow to nanoparticles; however, they did not participate in the BNNT nucleation and growth due to the low solubility of BN precursors therein, and were eventually attached to the external surfaces of the BNNTs formed. As the temperature cooled down further, the BNNT growth was terminated and BNNTs functionalized with metal/ceramic particles were collected from the collection chamber. The degree of functionalization was adjusted by controlling the content of metal/ceramic nanoparticle in the feedstock mixture. For instance, the amounts of AlN were varied from 0 (control; no nanoparticles) to 50 wt. %.

While not wishing to be limited by theory, in processes such as the present induction plasma process, boron droplets act as sites for growth of BNNTs so additional metal catalyst particles are not needed for BNNT synthesis. However, as described in Canadian Patent No. 2,877,060 certain additional metal catalyst particles can also facilitate BNNT growth serving as extra seeds for the BNNT nucleation. In such cases, the metal catalyst particles exist inside the BNNTs and therefore may not significantly affect surface properties such as chemical reactivity. Furthermore, the amount of metal catalyst particles employed in the feedstock mixture has been limited to typically below 5 wt. %.

Figure 2:
FIG. 2 shows the raw material produced according to exemplary embodiments of the methods of the present application wherein the feedstock was 93.5 wt % hexagonal boron nitride (h-BN) and 6.5 wt % AlN (middle); or 50 wt % h-BN and 50 wt % AlN (right) in comparison to a comparative example wherein the feedstock was 100 wt % h-BN (left).

The raw materials produced with three different AlN contents (i.e., 0, 6.5, and 50 wt. %) in the feedstock are shown in FIG. 2. BNNTs were successfully synthesized even at the relatively high content of AlN of 50 wt. %. While not wishing to be limited by theory, this implies that the presence of foreign particles (e.g., AlN) in the feedstock surprisingly did not have a significant effect on the nucleation and growth of BNNTs; the amount of metal or ceramic powder in the feedstock mixture injected into the reactor can be up to about 50 wt. % without having a significant effect on BNNT nucleation and growth.

Figure 3:
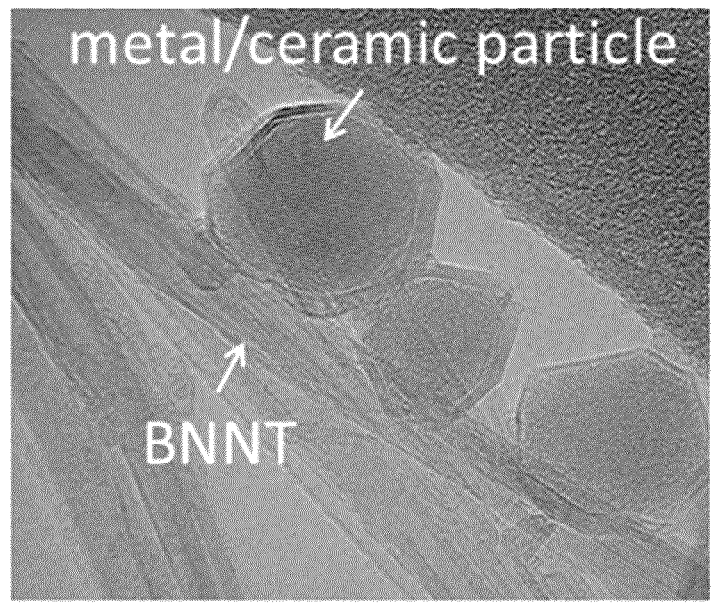
FIG. 3 shows a transmission electron microscopy (TEM) image of a boron nitride nanotube (BNNT)-AlN nanoparticle composite according to an exemplary embodiment of the present application (top) and the same image at higher magnification (bottom). Scale bar in bottom image shows 5 nm.
Figure 3:
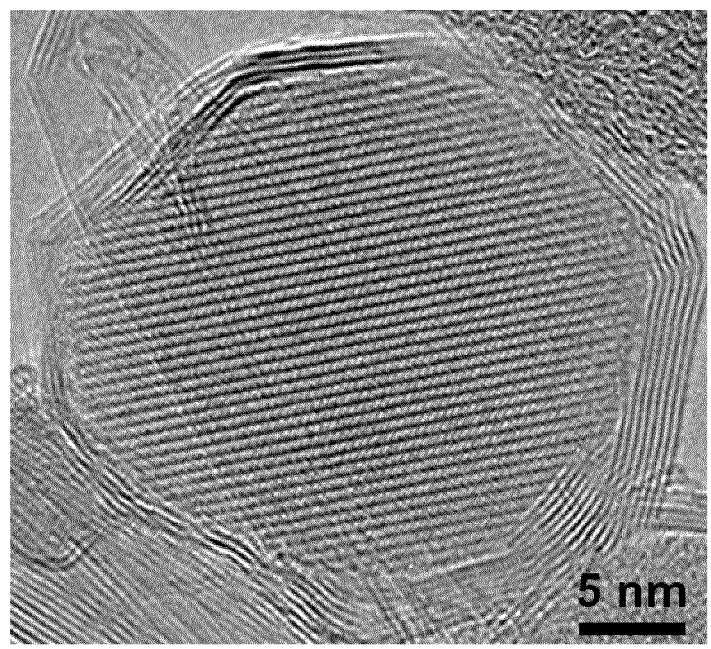
Figure 4:
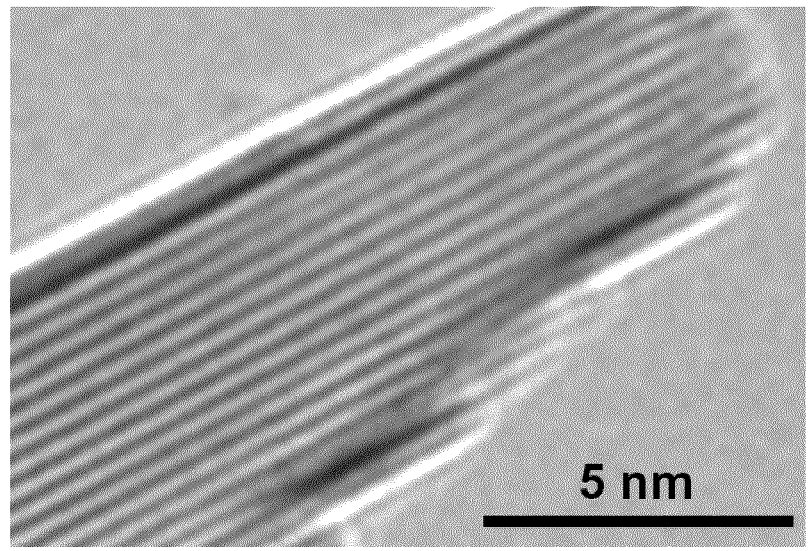
FIG. 4 shows TEM images of an exemplary hBN nanoparticle (top) and an exemplary B nanoparticle (bottom). Scale bars show 5 nm.
Figure 4:
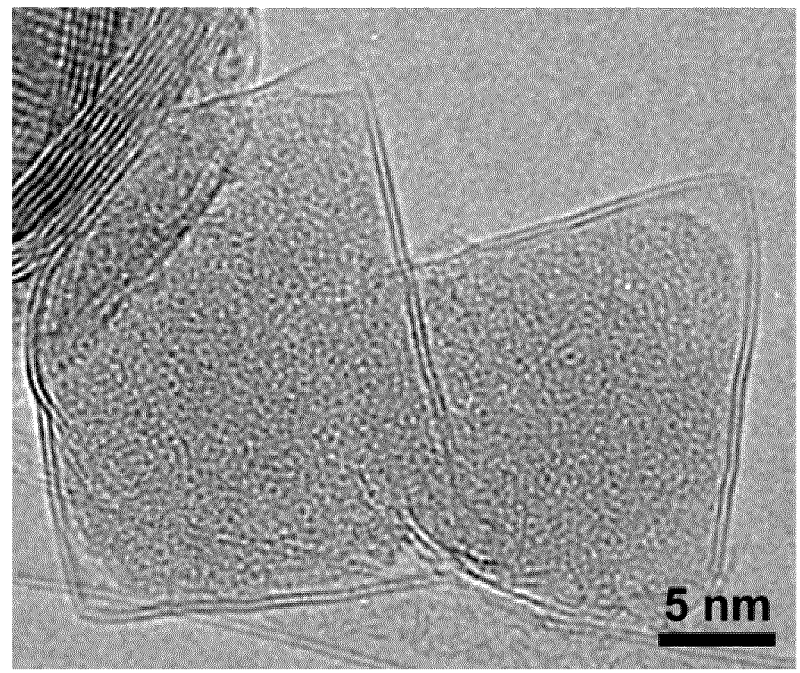

Further, under the conditions used in the present induction plasma process, some ceramic (e.g., AlN, TiN) or metal particles (e.g., Cu, Al) do not facilitate BNNT growth due to the low solubility of BN precursors ($N_2$ or B) therein and/or low vaporization temperatures. In other words, they do not act as metal catalysts for the synthesis of BNNTs. In contrast; they can be utilized for the in-situ functionalization of BNNTs grown from boron droplets. For example, FIG. 3 clearly shows that the AlN nanoparticles are functionalizing the exterior surface of the BNNTs. In this sample, three different types of particles were formed; hBN, B and AlN. The nanoparticles in FIG. 3 were assigned to be AlN by comparing their crystal structure to that of hBN (e.g. FIG. 4; top) and B (e.g. FIG. 4; bottom).

Figure 5:
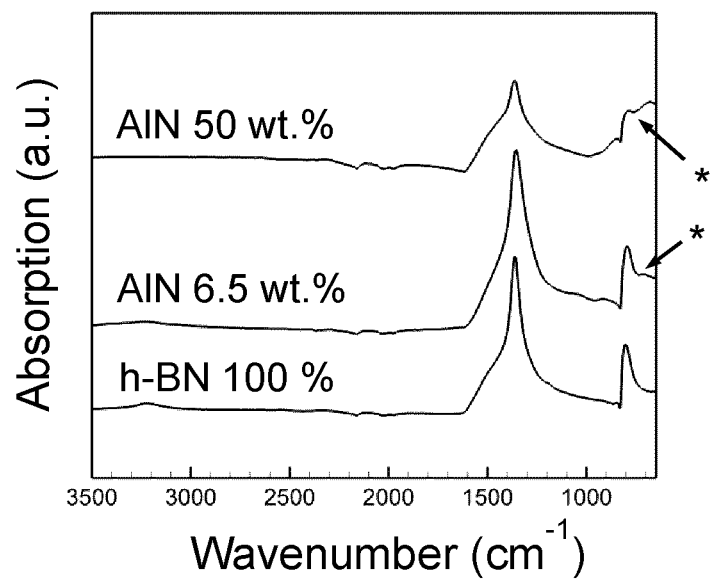
FIG. 5 shows the absorption as a function of wavenumber ($cm^{-1}$) for material produced according to exemplary embodiments of the methods of the present application wherein the feedstock was 93.5 wt % hexagonal boron nitride (h-BN) and 6.5 wt % AlN (middle trace); or 50 wt % h-BN and 50 wt % AlN (top trace) in comparison to a comparative example wherein the feedstock was 100 wt % h-BN (bottom trace). * indicates Al—N peaks at 750 $cm^{-1}$.

FIG. 5 shows spectroscopic characterization of the materials produced. The Fourier-transform infrared spectroscopy (FT-IR) spectra were recorded on an Agilent Cary 630 FTIR with Diamond Attenuated Total Reflectance (ATR). About 1 mg of sample was taken from the as-produced sample and used as is. The Al—N peak (indicated by *) at 750 cm$^{-1}$ is visible for materials produced using AlN-6.5 wt. % (middle trace) or AlN-50 wt. % (top trace).

Figure 6:
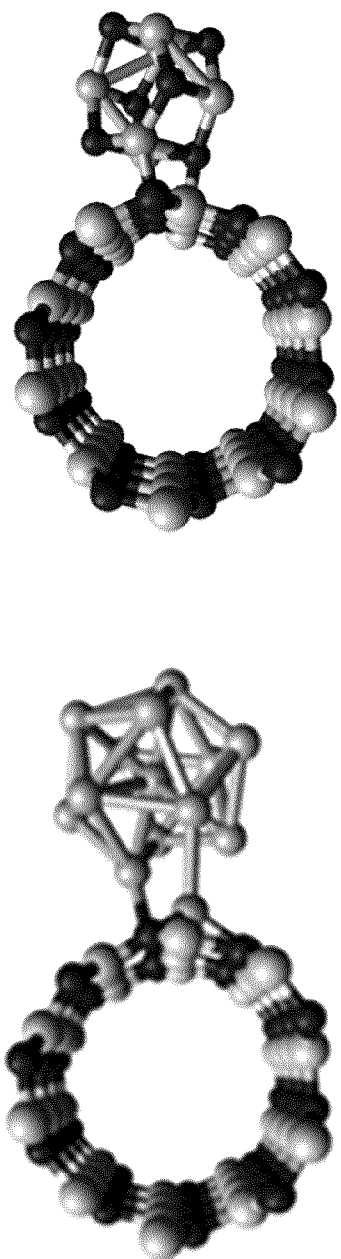
FIG. 6 shows models of BNNT functionalized with an aluminum cluster $Al_{13}@Al_1B_{39}N_{40}$ (bottom) and BNNT functionalized with an AlN cluster $Al_6N_6@B_{40}N_{40}$ (top) according to exemplary embodiments of the application.

Density functional theory (DFT) calculations have been performed to identify stable structures of BNNT-AlN hybrids and their optimum synthesis conditions (FIG. 6). As shown in FIG. 6, AlN clusters (i.e., nanoparticles) were found to be reactive with pristine BNNT surfaces to form BNNT-AlN hybrids ($Al_6N_6@B_{40}N_{40}$, top); and Al clusters were found to be reactive with BNNTs when BNNTs are doped with Al ($Al_{13}@Al_1B_{39}N_{40}$, bottom).

Advantages of this method over conventional technologies for preparing surface-modified BNNTs include the fact that it is an in-situ process, may be less time, energy, equipment, and/or chemical extensive, the degree of surface modification is controllable and there was good uniformity across samples.

Figure 7:
FIG. 7 shows the raw material produced according to an exemplary embodiment of the methods of the present application wherein the feedstock was 93.5 wt % hexagonal boron nitride (h-BN) and 6.5 wt % Cu.
Figure 8:
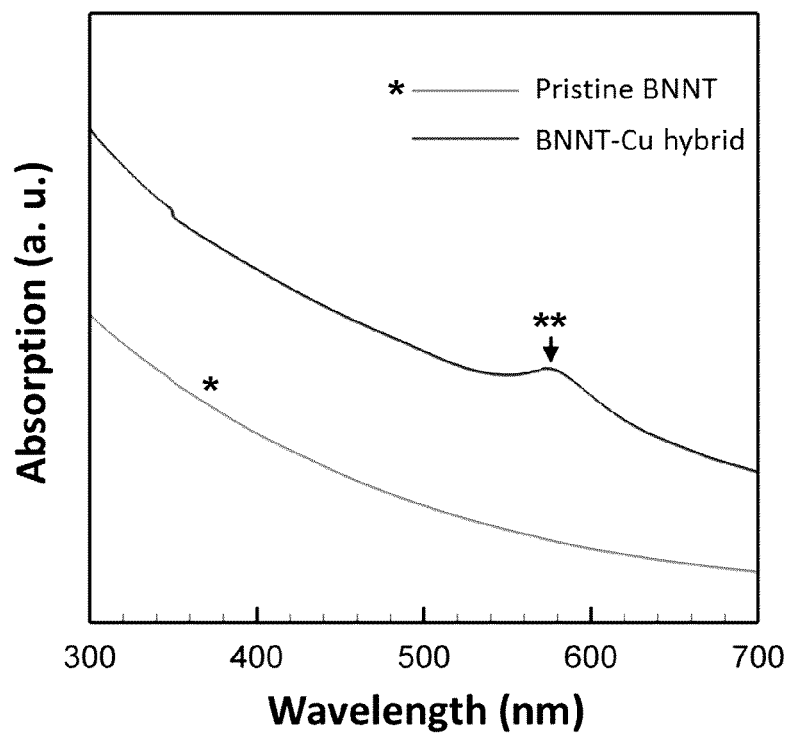
FIG. 8 is a plot showing the absorption in the ultraviolet-visible region of the raw material produced according to an exemplary embodiment of the methods of the present application wherein the feedstock was 93.5 wt % hexagonal boron nitride (h-BN) and 6.5 wt % Cu in comparison to pristine BNNTs (*). The Cu plasmon band at 570 nm is clearly observed (**) for the BNNT-Cu composite.

Copper ($Cu^0$) powder was also tested. FIG. 7 shows the raw material prepared when the feedstock was 93.5 wt. % hexagonal boron nitride (h-BN) and 6.5 wt. % Cu. FIG. 8 is a plot of ultraviolet-visible (UV-vis) measurement data which show the presence of Cu nanoparticles in a BNNT-Cu composite sample. In contrast to the pristine BNNT sample, in the spectrum of the BNNT-Cu composite, the Cu plasmon band at 570 nm is clearly observed suggesting the presence of Cu nanoparticles in the raw BNNT-Cu material.

Example 2

Preparation of BNNT-AlN Macroscopic Assemblies

Figure 9:
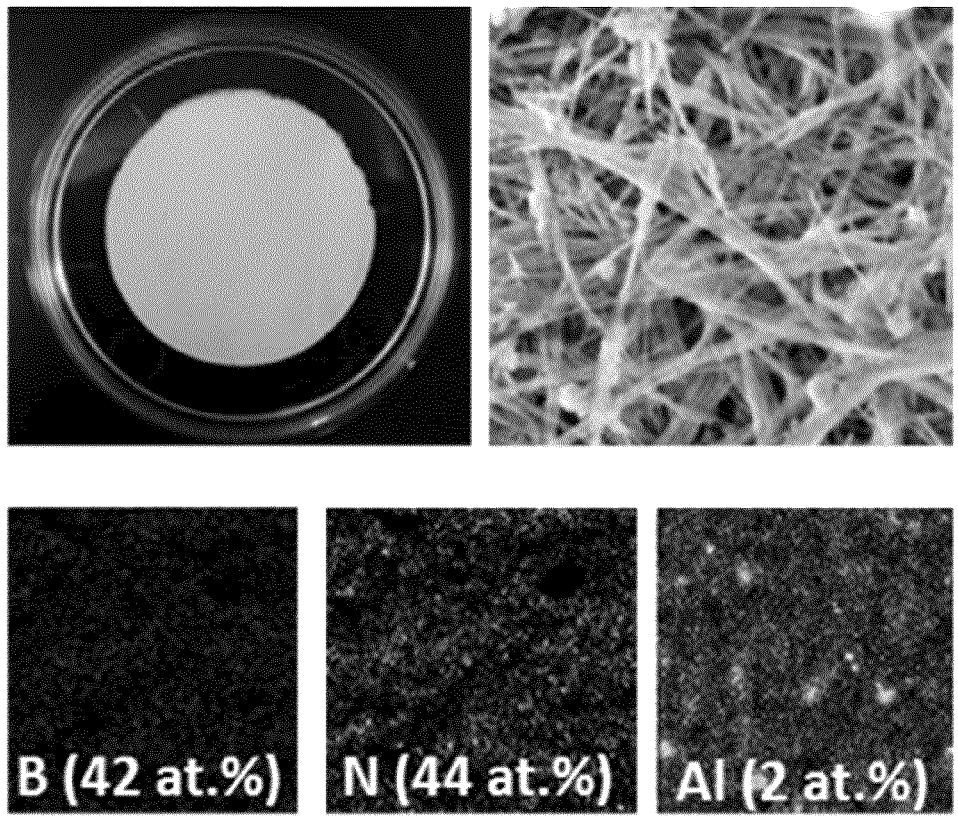
FIG. 9 shows an optical image (top left); a scanning electron microscopy (SEM) image (top right); and maps of elemental boron (B; bottom left), nitrogen (N; bottom centre) and aluminum (Al; bottom right) distribution as measured by energy-dispersive X-ray spectroscopy (EDX) of a BNNT-AlN composite buckypaper according to an exemplary embodiment of the present application.

It was found to be facile to fabricate macroscopic assemblies of BNNT-metal/ceramic hybrids (e.g., yarns, buckypapers, thin films) from the composites obtained as described in Example 1, hereinabove. As demonstrated in FIG. 9, a BNNT-AlN composite buckypaper can be easily fabricated by a vacuum filtration method such as that typically employed in the fabrication of CNT buckypapers. This buckypaper was flexible and has relatively uniform distribution of B, N, and Al as shown in its elemental maps. The buckypaper shown in the elemental maps of FIG. 9 was prepared using 6.5 wt. % of AlN in the feedstock. According to the EDX data, the elemental composition of the buckypaper was 42 at. % B, 44 at. % N and 2 at. % Al.

While the present application has been described with reference to what are presently considered to be the preferred examples, it is to be understood that the application is not limited to the disclosed examples. To the contrary, the present application is intended to cover various modifications and equivalent arrangements included within the spirit and scope of the appended claims.

All publications, patents and patent applications are herein incorporated by reference in their entirety to the same extent as if each individual publication, patent or patent application was specifically and individually indicated to be incorporated by reference in its entirety. Where a term in the present application is found to be defined differently in a document incorporated herein by reference, the definition provided herein is to serve as the definition for the term.

FULL CITATIONS FOR DOCUMENTS REFERRED TO IN THE DESCRIPTION

[1] M. Yamaguchi, D.-M. Tang, C. Zhi, Y. Bando, D. Shtansky and D. Golberg, "Synthesis, structural analysis and in situ transmission electron microscopy mechanical tests on individual aluminum matrix/boron nitride nanotube nanohybrids", *Acta Materialia* 2012, 60(17), 6213-6222.
[2] W.-Q. Han and A. Zettl, "Functionalized Boron Nitride Nanotubes with a Stannic Oxide Coating: A Novel Chemical Route to Full Coverage" *J. Am. Chem. Soc.* 2003 125(8), 2062-2063.
[3] C. Zhi, Y. Bando, C. Tang and D. Golberg, "$SnO_2$ Nanoparticle-Functionalized Boron Nitride Nanotubes" *J. Phys. Chem. B.* 2006, 110(17), 8548-8550.
[4] H. Chen., Y. Chen., Y. Liu, H. Zhang, C. P. Li, Z. Liu, S. P. Ringer and J. S. Williams, "Rare-earth doped boron nitride nanotubes" *Materials Science and Engineering: B* 2008, 146(1-3), 189-192.
[5] Y. Huang, J. Lin, Y. Bando, C. Tang, C. Zhi, Y. Shi, E. Takayama-Muromachi and D. Golberg, "BN nanotubes coated with uniformly distributed $Fe_3O_4$ nanoparticles: novel magneto-operable nanocomposites" *Journal of Materials Chemistry* 2010, 20(5), 1007-1011.
[6] Y. Yu, H. Chen and Y. Liu, "A Facile Strategy for the Functionalization of Boron Nitride Nanotubes with Pd Nanoparticles" *Journal of Nanomaterials,* Volume 2015, Article ID 310214, http://dx.doi.org/10.1155/2015/310214.
[7] C. M. Lee, S. I. Choi, S. S. Choi and S. H. Hong, "Synthesis of boron nitride nanotubes by arc-jet plasma" Current Applied Physics 2006, 6:2, 166-170.
[8] K. S. Kim, C. T. Kingston, A. Hrdina, M. B. Jakubinek, J. Guan, M. Plunkett, and B. Simard, "Hydrogen-catalyzed, pilot-scale production of small-diameter boron nitride nanotubes and their macroscopic assemblies" ACS Nano 2014, 8:6, 6211-6220.

The invention claimed is:

1. A method for preparing a boron nitride nanotube (BNNT)-nanoparticle composite, the method comprising:
 subjecting a source of hydrogen, a source of boron, a source of nitrogen and a nanoparticle precursor that is a non-catalytic metal or a non-catalytic ceramic to a stable induction thermal plasma to form a reaction mixture in the plasma; and
 cooling the reaction mixture to obtain the BNNT-nanoparticle composite with nanoparticles attached to on outer surface of BNNTs.

2. The method of claim 1, wherein the stable induction thermal plasma has a plasma temperature of about 1,000 K to about 10,000 K.

3. The method of claim 1, wherein the reaction mixture is formed in the plasma at a pressure of less than 2 atm.

4. The method of claim 1, wherein (a) the source of boron is boron nitride, elemental boron, borane, ammonia borane (borazane), borazine, a boron trihalide, a metal boride or mixtures thereof; (b) the source of nitrogen is boron nitride, $N_2$, $NH_3$, $NH_4OH$, borazane, borazine or mixtures thereof; and/or (c) the source of hydrogen is $H_2$, $NH_3$, $NH_4OH$, borane, borazane, borazine or mixtures thereof.

5. The method of claim 1, wherein the nanoparticle precursor is a metal ceramic, or a metallic element or alloy.

6. The method of claim 5, wherein the nanoparticle precursor is aluminum nitride (AlN), gallium nitride (GaN), tantalum nitride (TaN), tungsten nitride ($W_2N$, WN, $WN_2$), magnesium nitride ($Mg_3N_2$) or titanium nitride (TIN).

7. The method of claim 6, wherein the nanoparticle precursor is AlN.

8. The method of claim 5, wherein the nanoparticle precursor is copper metal, aluminum metal, silver metal, gold metal, gallium metal or magnesium metal.

9. The method of claim 8, wherein the nanoparticle precursor is copper metal.

10. The method of claim 1, wherein the source of boron is hexagonal boron nitride (h-BN); the source of nitrogen is a mixture of hexagonal boron nitride (h-BN) and $N_2$; and the source of hydrogen is $H_2$.

11. The method of claim 10, wherein the $N_2$ and $H_2$ are introduced into the stable induction plasma in a sheath gas.

12. The method of claim 11, wherein the sheath gas further comprises argon.

13. The method of claim 10, wherein the h-BN and the nanoparticle precursor are introduced into the stable induction plasma as a powder.

14. The method of claim 13, wherein the ratio by weight of the h-BN to the nanoparticle precursor is from about 99:0.1 to about 50:50.

15. The method of claim 14, wherein the ratio by weight of the h-BN to the nanoparticle precursor is from about 93.5:6.5 to about 50:50.

16. The method of claim 1, wherein cooling the reaction mixture comprises cooling in a reaction zone downstream of the stable induction plasma.

* * * * *